United States Patent
Yang

(10) Patent No.: US 9,655,033 B2
(45) Date of Patent: May 16, 2017

(54) MOBILE TERMINAL AND WIRELESS CONNECTION METHOD THEREOF

(71) Applicant: HUIZHOU TCL MOBILE COMMUNICATION CO., LTD, Huizhou, Guangdong (CN)

(72) Inventor: Zhibing Yang, Guangdong (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 0 days.

(21) Appl. No.: 14/387,051

(22) PCT Filed: Jul. 24, 2013

(86) PCT No.: PCT/CN2013/079963
§ 371 (c)(1),
(2) Date: Sep. 22, 2014

(87) PCT Pub. No.: WO2014/086153
PCT Pub. Date: Jun. 12, 2014

(65) Prior Publication Data
US 2015/0087302 A1     Mar. 26, 2015

(30) Foreign Application Priority Data
Dec. 6, 2012   (CN) .......................... 2012 1 0525912

(51) Int. Cl.
*H04W 4/00*     (2009.01)
*H04W 48/16*    (2009.01)
(Continued)

(52) U.S. Cl.
CPC ........... *H04W 48/16* (2013.01); *H04W 76/02* (2013.01); *H04W 48/20* (2013.01)

(58) Field of Classification Search
CPC ...... H04W 48/16; H04W 76/02; H04W 48/20
(Continued)

(56) References Cited

U.S. PATENT DOCUMENTS

2005/0020223 A1\* 1/2005 Ellis ......................... H04B 1/20
                                                            455/186.1
2008/0198811 A1\* 8/2008 Deshpande et al. .......... 370/332
(Continued)

FOREIGN PATENT DOCUMENTS

| CN | 101079769 A | 11/2007 |
|---|---|---|
| CN | 102970733 A | 3/2013 |
| CN | 101622887 A | 1/2016 |

*Primary Examiner* — Tanmay Shah
(74) *Attorney, Agent, or Firm* — Ladas & Parry LLP

(57) ABSTRACT

Disclosed is a wireless connection method for a mobile terminal. The method includes: starting to search for an access point in a current environment; judging whether the access point is found within a preset time, and when rise judgment result is yes, acquiring the found current access point and suspending the search; judging whether the access information recorded in advance matches the current access point, and when the judgment result is yes, accessing the current access point using the access information; storing the current access point in a list; and continuing searching for a next access point, and returning to the step of judging whether an access point is round within a preset time. Also disclosed is a mobile terminal. In this way, the mobile terminal and the wireless connection method therefor of the present invention can rapidly access an access point, improving the user experience.

14 Claims, 3 Drawing Sheets

(51) Int. Cl.
*H04W 76/02* (2009.01)
*H04W 48/20* (2009.01)

(58) Field of Classification Search
USPC .......................................................... 455/434
See application file for complete search history.

(56) References Cited

U.S. PATENT DOCUMENTS

2011/0286437 A1* 11/2011 Austin et al. .................. 370/338
2012/0317489 A1* 12/2012 Kuulusa .............. G06F 3/04883
                                                                                715/733

* cited by examiner

MOBILE TERMINAL AND WIRELESS CONNECTION METHOD THEREOF

This application is a national phase entry under 35 USC 371 of International Patent Application No. PCT/CN2013/079963 filed on 24 Jul. 2013, which was published on 12 Jun. 2014 with International Publication Number WO 2014/086153 A1, which claims priority from Chinese Patent Application No. 201210525912.1 filed on 6 Dec. 2012, the disclosures of which are incorporated in their entirety by reference herein.

FIELD OF THE INVENTION

The present disclosure relates to the technical field of wireless communication technologies, and more particularly to a mobile terminal and a wireless connection method thereof.

BACKGROUND OF THE INVENTION

WIFI (Wireless Fidelity) is applied in more and more mobile terminals. As a standard component of the mobile terminals, WIFI chips can establish WIFI connection with access points (APs) for data communication. Nowadays, people are using WIFI connections more and more frequently in the daily life, study and work, so access points have been deployed in many houses and also been deployed in many public places such as cafes, airports, stations, libraries and so on. Thus, the mobile terminals can be connected to the internet via the access points.

In many circumstances, there is more than one access point. When there are a lot of access points, a conventional way to search for and access an access point is as follows: search for all available access points in the current environment, then look for an access point pre-recorded by the user from all the access points one by one, and use access information pre-stored by the user to access the access point once the pre-recorded access-point is found, thus complete the connection process. This requires it must complete the searching process and then access, thus the speed of accessing the access point is slow particularly when the number of the access points is great, and it adversely affects the users' experiences.

SUMMARY OF THE INVENTION

A primary object of the present disclosure is to provide a mobile terminal and a wireless connection method thereof, which can connect to an access point after each time the access point is found.

To solve the aforesaid technical problem, a technical solution adopted in the present disclosure is to provide a wireless connection method for a mobile terminal, which comprises: beginning to search for an access point in a current environment; determining whether any access point is found within a predetermined time, and if a determination result thereof is yes, acquiring a current access point that is found and suspending the searching; determining whether access information that is pre-recorded matches the current access point, and if a determination result thereof is yes, determining whether another access point has been accessed; determining whether the current access point has a priority level higher than that of the another access point if the another access point has been accessed, wherein the priority level is represented by a signal strength; disconnecting the connection with the another access point and using the access information to access the current access point if the priority level of the current access point is higher than that of the another access point; saving the current access point into a list; and continuing to search for a next access point, and returning to the step of determining whether any access point is found within a predetermined time.

The wireless connection method further comprises: ending the searching if the determination result of the step of determining whether any access point is found within a predetermined time is no.

The wireless connection method further comprises: executing the step of saving the current access point into a list if the determination result of the step of determining whether access information that is pre-recorded matches the current access point is no.

The wireless connection method further comprises: executing the step of using the access information to access the current access point if the determination result of the step of determining whether another access point has been accessed is no.

The wireless connection method further comprises: executing the step of saving the current access point into a list if the determination result of the step of determining whether the current access point has a priority level higher than that of the another access point is no.

The wireless connection method further comprises: arranging all access points in the list in a descending order according to priority levels thereof after the searching is ended.

To solve the aforesaid technical problem, another technical solution adopted in the present disclosure is to provide a wireless connection method for a mobile terminal, which comprises: beginning to search for an access point in a current environment; determining whether any access point is found within a predetermined time, and if a determination result thereof is yes, acquiring a current access point that is found and suspending the searching; determining whether access information that is pre-recorded matches the current access point, and if a determination result thereof is yes, using the access information to access the current access point; saving the current access point into a list; and continuing to search for a next access point, and returning to the step of determining whether any access point is found within a predetermined time.

The wireless connection method further comprises: ending the searching if the determination result of the step of determining whether any access point is found within a predetermined time is no.

The wireless connection method further comprises: executing the step of saving the current access point into a list if the determination result of the step of determining whether access information that is pre-recorded matches the current access point is no.

After the step of determining whether access information that is pre-recorded matches the current access point and before the step of using the access information to access the current access point, the wireless connection method further comprises: determining whether another access point has been accessed if the determination result of the step of determining whether access information that is pre-recorded matches the current access point is yes, and if a determination result thereof is no, executing the step of using the access information to access the current access point.

After the step of determining whether another access point has been accessed, the wireless connection method further comprises: determining whether the current access point has a priority level higher than that of the another access point if the determination result of the step of determining whether another access point has been accessed is yes; and if a determination result thereof is yes, disconnecting connection with the another access point and executing the step of using the access information to access the current access point.

The step of determining whether the current access point has a priority level higher than that of the another access point further comprises: saving the current access point into the list if the determination result thereof is no.

The priority level is represented by a signal strength.

The wireless connection method further comprises: arranging all access points in the list in a descending order according to priority levels thereof after the searching is ended.

To solve the aforesaid technical problem, a further technical solution adopted in the present disclosure is to provide a mobile terminal, which comprises: a WIFI chip, being configured to search for and access an access point; and a baseband-signal processing chip, being connected with the WIFI chip and comprising a control module, a first determining module, a second determining module and a storage module therein, with a list being provided in the storage module, wherein: the control module is configured to control the WIFI chip to begin to search for an access point in a current environment according to an operation of a user; the first determining module is configured to determine whether any access point is found by the WIFI chip within a predetermined time, and if a determination result thereof is yes, notify the storage module to acquire a current access point that is found and notify the control module to control the WIFI chip to suspend the searching; the second determining module is configured to determine whether access information that is pre-recorded in the storage module matches the current access point if the determination result of the first determining module is yes, and if a determining result of the second determining module is yes, notify the control module to control the WIFI chip to access the current access point by using the access information and control the WIFI chip to continue to search for a next access point, and notify the storage module to save the current access point into the list.

The baseband-signal processing chip further comprises a power-supply management module for supplying power to the WIFI chip.

The present disclosure has the following benefits: as compared with the prior art, the mobile terminal and the wireless connection method thereof of the present disclosure suspend the searching after an access point is found, determine whether access information that is pre-recorded matches the access point, and access the access point if the determination result is yes and then continue to search for a next access point. In this way, by connecting to an access point after each time the access point is found, the mobile terminal can access the access point quickly to improve the users' experiences.

DETAILED DESCRIPTION OF THE INVENTION

The present disclosure will be detailed herein below with reference to the attached drawings and the embodiments.

Figure 1:
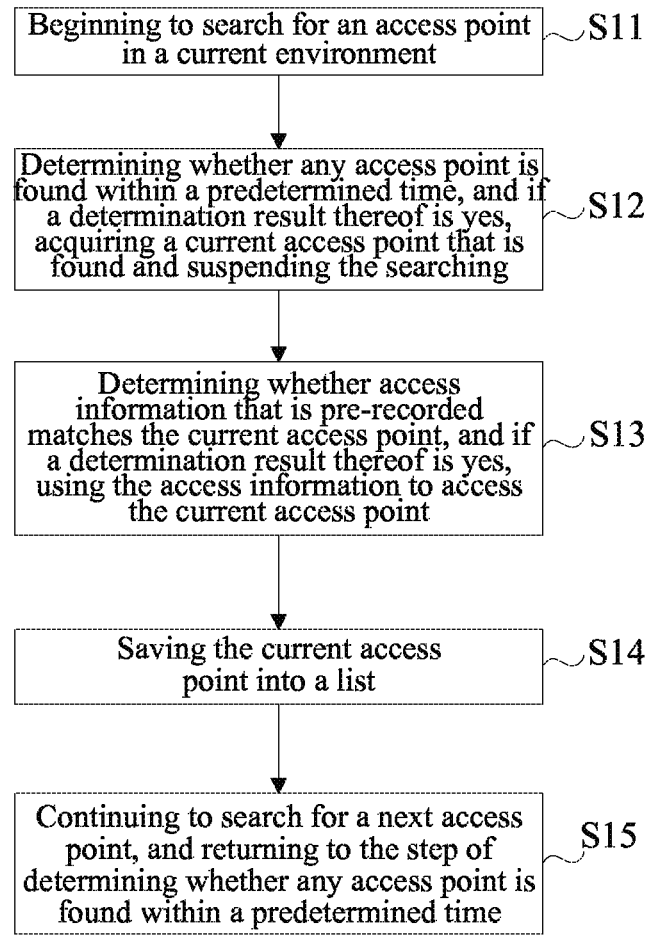
FIG. 1 is a schematic flowchart diagram of a wireless connection method for a mobile terminal according to a first embodiment of the present disclosure.

Refer to FIG. 1, which shows a schematic flowchart diagram of a wireless connection method for a mobile terminal according to a first embodiment of the present disclosure. The wireless connection method comprises following steps of:

Step S11: beginning to search for an access point in a current environment.

When there are access points available for use in the current environment, it begins to search for the access points in the current environment according to the user's choice.

Step S12: determining whether any access point is found within a predetermined time, and if a determination result thereof is yes, acquiring a current access point that is found and suspending the searching.

The user does not know whether any access point exists in the current environment when searching for the access points, and if the searching is continued when there is no access point in the current environment, the power consumption will be undoubtedly increased and also, the user may become puzzled. Therefore, a predetermined time is set. If no access point is found within the predetermined time (i.e., if the determination result is no), the searching is ended; and if an access point is found, the searching is suspended to execute a next step. In this way, the user can promptly find out if there is any available access point nearby, and may choose to connect to the internet in other ways when there is no available access point.

Step S13: determining whether access information that is pre-recorded matches the current access point, and if a determination result thereof is yes, using the access information to access the current access point.

The access information is verification information for accessing an access point, and comprises the access point name, the access point type, the access password, the encryption mechanism and so on. There may be a plurality of kinds of access information, with each kind matching one access point. The access information is pre-recorded, and specifically, the access information may be acquired when the user accesses an access point before, may be inputted manually by the user before the user begins to search for an access point, or may be acquired from the outside through the near field communication connection (e.g., NFC (Near Field Communication)), and the present disclosure has no limitation on the way to acquire the access information.

If the access information that is pre-recorded matches the current access point (e.g., if the user has accessed the current access point before), then the access information can be used to access the current access point. The way to determine whether the access information that is pre-recorded matches the current access point is to compare the access point name and the access point type in the access information with the name and the type of the current access point. If the two names and the two types are consistent with each other respectively, it means that the matching is successful, and then the access password is input for verification according to the encryption mechanism.

Step S14: saving the current access point into a list.

The current access point is saved into a list after the current access point has been accessed to make it convenient for the user to view later on. In this embodiment, if the access information does not match the current access point, the current access point is also saved into a list.

Step S15: continuing to search for a next access point, and returning to the step of determining whether any access point is found within a predetermined time.

Because there are also other access points in the current environment, the user continues to search for a next access point after the current access point has been accessed.

The wireless connection method of this embodiment suspends the searching after a current access point is found to try connecting to the current access point, and continues to search for other access points after the current access point has been accessed, and also continues to search for other access points even if the current access point fails to be accessed. As compared to the prior art which tries accessing access points one by one only after all the access points have been found, the wireless accessing method of the present disclosure connects to an access point each time the access point is found, which allows access points to be accessed quickly to improve the users' experiences.

Figure 2:
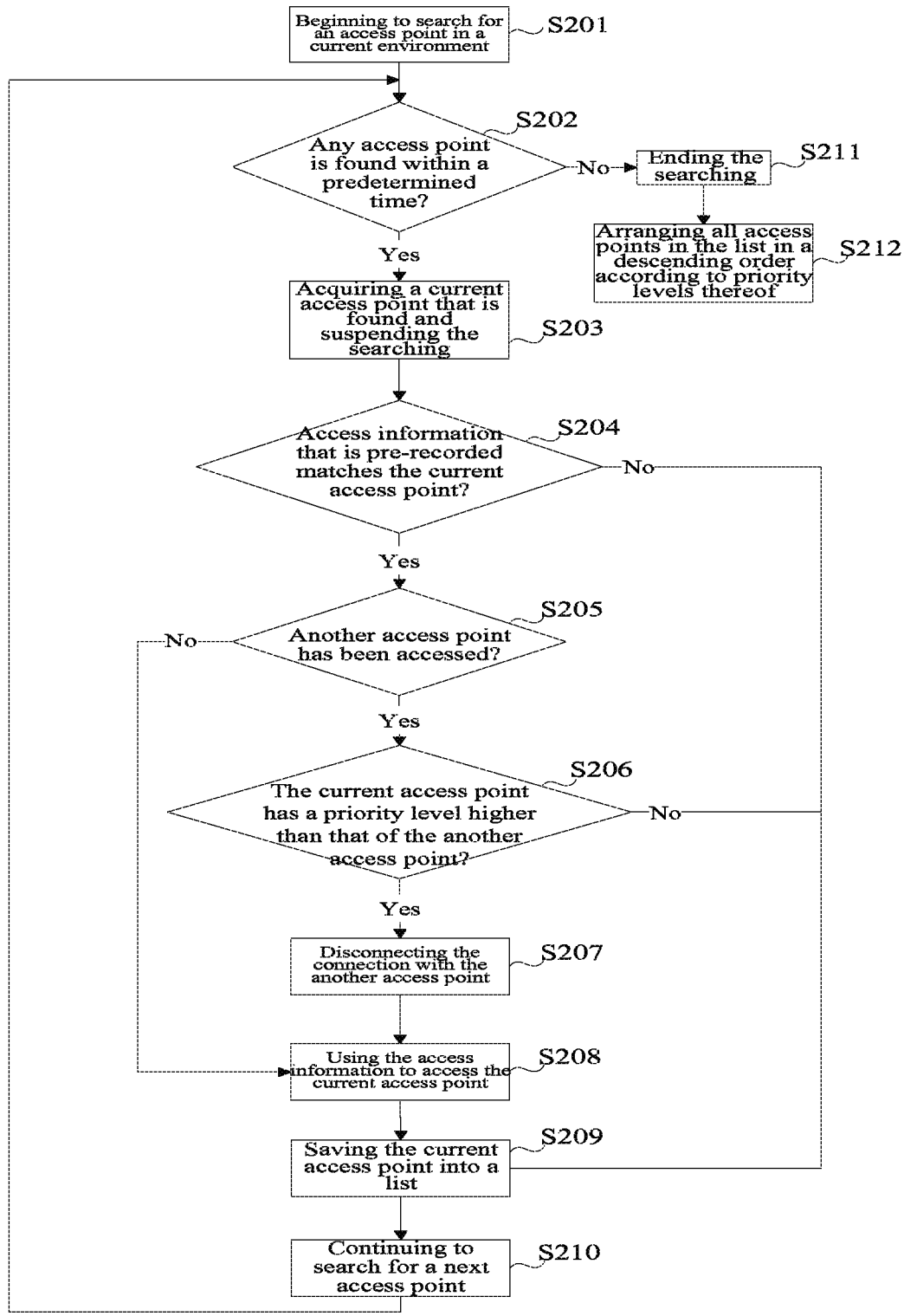
FIG. 2 is a schematic flowchart diagram of a wireless connection method for a mobile terminal according to a second embodiment of the present disclosure.

Refer to FIG. 2, which shows a schematic flowchart diagram of a wireless connection method for a mobile terminal according to a second embodiment of the present disclosure. The wireless connection method comprises the following steps of:

Step S201: beginning to search for an access point in a current environment.

Step S202: determining whether any access point is found within a predetermined time, and if a determination result thereof is yes, proceeding to step S203, and if the determination result thereof is no, proceeding to step S211.

When no access point is found, the searching is ended and a prompt is given to the user. This can reduce the power consumption and makes it convenient for the user to know the progress of the searching process.

Step S203: acquiring a current access point that is found and suspending the searching.

Step S204: determining whether access information that is pre-recorded matches the current access point, and if a determination result thereof is yes, proceeding to step S205, and if the determination result thereof is no, proceeding to step S209.

Step S205: determining whether another access point has been accessed, and if a determination result thereof is yes, proceeding to step S206, and if the determination result thereof is no, proceeding to step S208.

In real practice, the user might have already accessed an access point before moving into the current environment, and because the access point is connected wirelessly, the connection with the previous access point may be still remained after the user moved into the current environment. However, the user wants to search in the current environment again to see if there are other available access points. Therefore, after a current access point is found, whether the user has accessed any other access point is determined.

Step S206: determining whether the current access point has a priority level higher than that of the another access point, and if a determination result thereof is yes, proceeding to step S207, and if the determination result thereof is no, proceeding to step S209.

After it is determined that the user has accessed an access point, the priority level also needs to be determined. After having found the current access point, the user needs to know the priority level of the current access point to decide whether to replace the access point that has already been accessed with the current access point or not. In this embodiment, the priority level is represented by the signal strength, and a higher signal strength represents a higher priority level.

Step S207: disconnecting the connection with the another access point.

If the current access point has a priority level higher than that of the another access point, then the connection with the another access point is disconnected.

Step S208: using the access information to access the current access point.

The access information is used to access the current access point after the connection with the another accessing point is disconnected. The way to access the current access point comprises: automatically matching the access point name, inputting the access password according to the encryption mechanism and so on. The connection reliability can be enhanced by accessing the current access point.

Step S209: saving the current access point into a list.

No matter whether or not the current access point has been accessed, the current access point will be saved into a list all the same for the user to look up conveniently later on and for quick matching in the next searching process.

Step S210: continuing to search for a next access point, and returning to the step S202.

During the process of searching for a next access point, continue to determine whether any access point is found within a predetermined time so as to try connecting to the next access point. This step can be repeated to find all access points in the current environment.

Step S211: ending the searching

If no access point is found within the predetermined time, then it is determined that there is no access point in the current environment or all access points have been found. In this case, the searching is ended. In this embodiment, the predetermined time may be set to be 10 seconds.

Step S212: arranging all access points in the list in a descending order according to priority levels thereof.

All access points are displayed in a list after the searching is ended. In some instances, the access information is not pre-recorded by the user, but the user can manually select an access point and then input the access information to access the access point. After the user has accessed the access point, the access information of the access point will be automatically saved. The access points in the list are arranged in a descending order according to priority levels thereof; and the accessing points having high priority levels are topped to make it convenient for the user to select them first.

In the wireless connection method of this embodiment, if the user has accessed another access point when a current access point is found and the current access point has a priority level higher than that of the another access point, then the connection with the another access point will be disconnected and the current access point will be accessed by using the access information. Thereby, it is ensured that the user can connect to the access point having the highest priority level in the process of searching for access points to get a reliable connection.

Figure 3:
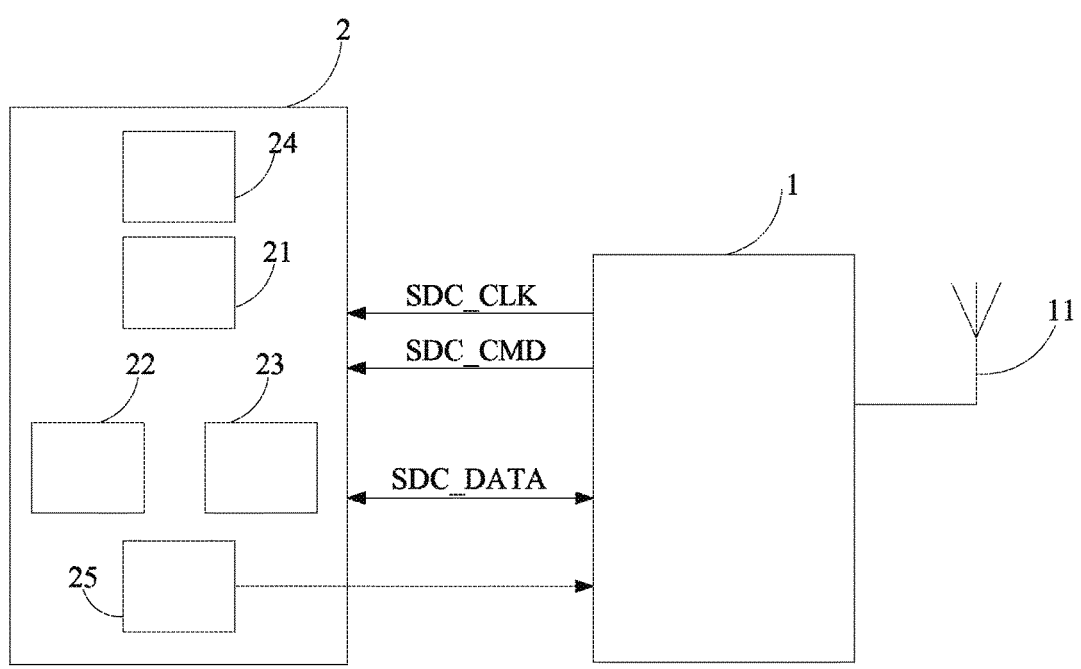
FIG. 3 is a schematic structural view of a mobile terminal according to an embodiment of the present disclosure.

Refer to FIG. 3, which shows a schematic structural view of a mobile terminal according to an embodiment of the present disclosure. The mobile terminal comprises a WIFI chip 1 and a baseband-signal processing chip 2. In this embodiment, the mobile terminal may be a mobile phone or a tablet computer.

The WIFI chip 1 is configured to search for and access an access point. In this embodiment, the WIFI chip searches for and accesses an access point via a WIFI antenna 11.

The baseband-signal processing chip 2 is connected to the WIFI chip 1. In this embodiment, the baseband-signal processing chip 2 is connected to the WIFI chip 1 via an SDIO bus. The SDIO bus comprises an SDC_CLK wire, an SDC_CMD wire, and an SDC_DATA wire. The SDC_CLK wire is configured to transmit a clock signal, the SDC_CMD wire is configured to transmit a control command, and the SDC_DATA is configured to transmit data. The baseband-signal processing chip 2 comprises a control module 21, a first determining module 22, a second determining module 23 and a storage module 24 therein. The storage module 24 is provided with a list.

The control module 21 is configured to control the WIFI chip 1 to begin to search for an access point in a current environment according to an operation of a user.

The first determining module 22 is configured to determine whether any access point is found by the WIFI chip 1 within a predetermined time, and if the determination result is yes, notify the storage module 24 to acquire the current access point that is found and notify the control module 21 to control the WIFI chip 1 to suspend the searching.

The second determining module 23 is configured to determine whether access information that is pre-recorded in the storage module 24 matches the current access point if the determination result of the first determining module is yes, and if the determination result of the second determining module is yes, notify the control module 21 to control the WIFI chip 1 to access the current access point by using the access information and control the WIFI chip 1 to continue to search for a next access point, and notify the storage module 24 to save the current access point into the list.

The first determining module 22 and the second determining module 23 execute the two determining processes respectively. However, when the baseband-signal processing chip 2 comprises only one determining module, the determining module may be set to execute both the two determining processes.

In this embodiment, the baseband-signal processing chip 2 also comprises a power-supply management module 25 for supplying power to the WIFI chip 1.

According to the above descriptions, the mobile terminal and the wireless connection method thereof of the present disclosure suspend the searching when an access point is found, determine whether access information that is pre-recorded matches the access point, access the access point if the determination result is yes, and then continue to search for a next access point. This allows access points to be accessed quickly by connecting to an access point each time an access point is found. Furthermore, if the user has accessed other access points before accessing a current access point and the current access point has a priority level higher than that of the another access point, the connection with the another access point will be disconnected to access the current access point so that a reliable connection can be ensured.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A wireless connection method for a mobile terminal, comprising:
   beginning to search for an access point in a current environment;
   determining whether any one access point is found during the searching within a predetermined time, and if any one access point is found, acquiring the found access point as a current access point that is found and suspending the searching without searching for all available access points in the current environment; and if no any access point is found during the searching within the predetermined time, ending the searching and giving a prompt to a user;
   determining whether access information that is pre-recorded matches the current access point, and if a determination result thereof is yes, determining whether another access points has been accessed;
   determining whether the current access point has a priority level higher than that of the another access point if the another access points has been accessed, wherein the priority level is represented by a signal strength;
   disconnecting the connection with the another access point and using the access information to access the current access point if the priority level of the current access point is higher than that of the another access point;
   saving the current access point into a list; and
   continuing to search for a next access point after accessing the current access point, and returning to the step of determining whether any access point is found within a predetermined time to search for all of the available access points in the current environment.

2. The wireless connection method of claim 1, further comprising:
   executing the step of saving the current access point into a list if the determination result of the step of determining whether access information that is pre-recorded matches the current access point is no.

3. The wireless connection method of claim 2, further comprising:
   executing the step of using the access information to access the current access point if the determination result of the step of determining whether another access point has been accessed is no.

4. The wireless connection method of claim 3, further comprising:
   executing the step of saving the current access point into a list if the determination result of the step of determining whether the current access point has a priority level higher than that of the another access point is no.

5. The wireless connection method of claim 4, further comprising:
   arranging all access points in the list in a descending order according to priority levels thereof after the searching is ended.

6. A wireless connection method for a mobile terminal, comprising:
   beginning to search for an access point in a current environment;
   determining whether any one access point is found during the searching within a predetermined time, and if any one access point is found, acquiring the found access point as a current access point that is found and suspending the searching without searching for all available access points in the current environment; and if no any access point is found during the searching within the predetermined time, ending the searching and giving a prompt to a user;

determining whether access information that is pre-recorded matches the current access point, and if a determination result thereof is yes, using the access information to access the current access point;

saving the current access point into a list; and continuing to search for a next access point after accessing the current access point, and returning to the step of determining whether any access point is found within a predetermined time to search for all of the available access points in the current environment.

7. The wireless connection method of claim 6, further comprising:

executing the step of saving the current access point into a list if the determination result of the step of determining whether access information that is pre-recorded matches the current access point is no.

8. The wireless connection method of claim 7, after the step of determining whether access information that is pre-recorded matches the current access point and before the step of using the access information to access the current access point, the wireless connection method further comprising:

determining whether another access point has been accessed if the determination result of the step of determining whether access information that is pre-recorded matches the current access point is yes, and if a determination result thereof is no, executing the step of using the access information to access the current access point.

9. The wireless connection method of claim 8, after the step of determining whether another access point has been accessed, the wireless connection method further comprising:

determining whether the current access point has a priority level higher than that of the another access point if the determination result of the step of determining whether another access point has been accessed is yes; and if a determination result thereof is yes, disconnecting connection with the another access point and executing the step of using the access information to access the current access point.

10. The wireless connection method of claim 9, wherein the step of determining whether the current access point has a priority level higher than that of the another access point further comprises:

saving the current access point into the list if the determination result thereof is no.

11. The wireless connection method of claim 9, wherein the priority level is represented by a signal strength.

12. The wireless connection method of claim 9, further comprising:

arranging all access points in the list in a descending order according to priority levels thereof after the searching is ended.

13. A mobile terminal, comprising:

a WIFI chip, being configured to search for and access an access point; and a baseband-signal processing chip, being connected with the WIFI chip and comprising a control module, a first determining module, a second determining module and a storage module therein, with a list being provided in the storage module, wherein:

the control module is configured to control the WIFI chip to begin to search for an access point in a current environment according to an operation of a user;

the first determining module is configured to determine whether any one access point is found by the WIFI chip during the searching within a predetermined time, and if any one access point is found, notify the storage module to acquire the found access point as a current access point that is found and notify the control module to control the WIFI chip to suspend the searching without searching for all available access points in the current environment; and if no any access point is found during the searching within the predetermined time, notify the control module to control the WIFI chip to end the searching and give a prompt to a user;

the second determining module is configured to determine whether access information that is pre-recorded in the storage module matches the current access point if the determination result of the first determining module is yes, and if a determination result of the second determining module is yes, notify the control module to control the WIFI chip to access the current access point by using the access information and control the WIFI chip to continue to search for a next access point, and notify the storage module to save the current access point into the list, notify the WIFI chip to continue to search for a next access point after accessing the current point, and notify the first determining module to returning to the step of determining whether any access point is found within a predetermined time to search for all of the available access points in the current environment.

14. The mobile terminal of claim 13, wherein the baseband-signal processing chip further comprises a power-supply management module for supplying power to the WIFI chip.

* * * * *